United States Patent [19]

Ishikawa et al.

[11] Patent Number: 4,535,043

[45] Date of Patent: Aug. 13, 1985

[54] ELECTROPHOTOGRAPHIC PHOTOSENSITIVE MEMBER

[75] Inventors: Shozo Ishikawa, Yokohama; Hitoshi Toma, Kawasaki; Fumio Sumino, Tokyo, all of Japan

[73] Assignee: Canon Kabushiki Kaisha, Tokyo, Japan

[21] Appl. No.: 605,839

[22] Filed: May 1, 1984

[30] Foreign Application Priority Data

May 9, 1983 [JP] Japan .................................. 58-81105

[51] Int. Cl.³ ............................................. G03G 5/14
[52] U.S. Cl. ........................................ 430/58; 430/78
[58] Field of Search ..................................... 430/58, 78

[56] References Cited

U.S. PATENT DOCUMENTS 4,423,129 12/1983 Takasu et al. ......................... 430/59
4,456,671 6/1984 Mabuchi et al. ...................... 430/60
4,471,039 9/1984 Borsenberger et al. .............. 430/76

Primary Examiner—John D. Welsh
Attorney, Agent, or Firm—Fitzpatrick, Cella, Harper & Scinto

[57] ABSTRACT

An electrophotographic photosensitive member having a photosensitive layer of a laminate structure comprising a charge generation layer and a charge transport layer on a conductive substrate, characterized in that the charge generation layer contains an aluminum chloride phthalocyanine pigment and the charge transport layer contains a hydrazone compound represented by the general formula

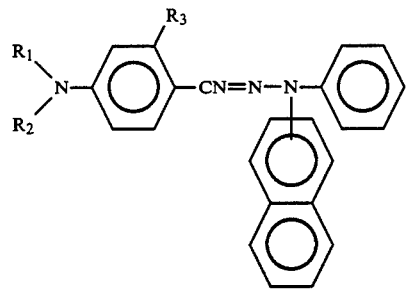

wherein $R_1$ and $R_2$ represent alkyls or are residues forming a cyclic amino group together with the nitrogen atom which links them, and $R_3$ represents hydrogen or halogen.

8 Claims, 1 Drawing Figure

ELECTROPHOTOGRAPHIC PHOTOSENSITIVE MEMBER

BACKGROUND OF THE INVENTION

1. Field of the Invention

The present invention relates to an electrophotographic photosensitive member and more particularly to an electrophotographic photosensitive member suitable for electrophotographic printers which are provided with lasers as the light source.

2. Description of the Prior Art

Electrophotographic printers provided with lasers as the light source can reproduce images as desired, by modulating the laser beam with electric signals according to image information, scanning the surface of a photosensitive member with the modulated laser beam to form electrostatic latent images, and developing the latent images with a toner followed by transferring the toner images. Lasers generally used hitherto in these printers are gas lasers such as a helium-cadmium laser (wavelength: 441.6 nm) and a helium-neon laser (wavelength: 632.8 nm). Accordingly, photosensitive members spectral-sensitized up to about 650 nm are sufficient for these light sources. There are known photosensitive members for this purpose, for example; one having a photosensitive layer comprising a charge-transfer complex of polyvinylcarbazole with trinitrofluoreneone; one having as a photosensitive layer a vapor-deposition layer of tellurium sensitized with selenium; one having a photosensitive laminate comprising a selenium layer vapor-deposited as a charge transport layer on a conductive layer and a selenium-tellurium layer vapor-deposited on the charge transport layer; one having a photosensitive layer comprising cadmium sulfide which is spectral-sensitized with sensitizing dye; and one having a photosensitive laminate of separate function type consisting of an organic-pigment-containing charge generation layer and a charge transport layer, the sensible wavelength region of which is extended to the longer wavelength side.

Meanwhile, semiconductor lasers which are small-sized, inexpensive, and in addition directly modulable have been developed in recent years. However, most of these semiconductor lasers have a wavelength of 750 nm or more and photosensitive members as cited above are completely or virtually insensitive to rays of wavelengths of 750 nm and more. This hinders the application of semiconductor lasers to electrophotographic printers.

Lately, aluminum chloride phthalocyanine was found to be effective as a sensitive material for these semiconductor lasers, but the sensitivity thereof, when it is used in a separate function type of laminated photosensitive member, is at an insufficient level.

SUMMARY OF THE INVENTION

An object of the invention is to provide an electrophotographic photosensitive member which solves the above noted difficulty.

Another object of the invention is to provide an electrophotographic photosensitive member suitable for electrophotographic printers which employ a laser as a light source.

Another object of the invention is to provide an electrophotographic photosensitive member suitable for electrophotographic printers which employ as a light source a semiconductor laser of emission wavelength 750 nm or more.

Another object of the invention is to provide an electrophotographic photosensitive member having high sensitivity to rays of wavelengths 750 nm and more.

Another object of the invention is to provide an electrophotographic photosensitive member improved photomemory property.

These and other objects of the invention are achieved with an electrophotographic photosensitive member having a photosensitive layer of a laminate structure comprising a charge generation layer and a charge transport layer, characterized in that the charge generation layer contains aluminum chloride phthalocyanine pigment and the charge transport layer contains a hydrazone compound represented by the general formula

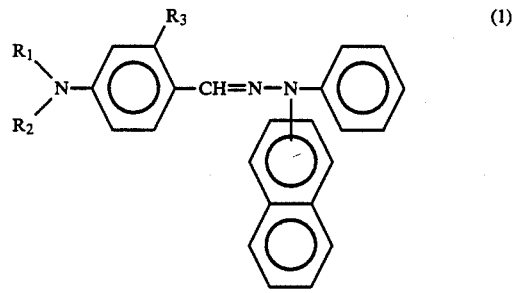

(1)

wherein, $R_1$ and $R_2$ represents alkyls or are residues forming a cyclic amino group together with the nitrogen atoms which links them, and $R_3$ represents hydrogen or halogen atom.

BRIEF DESCRIPTION OF TH DRAWING

FIG. 1 shows an absorption spectrum of a coating film formed on a glass plate by applying a dispersion of aluminum chloride phthalocyanine in a resin solution.

DETAILED DESCRIPTION OF THE PREFERRED EMBODIMENT

Figure 1:
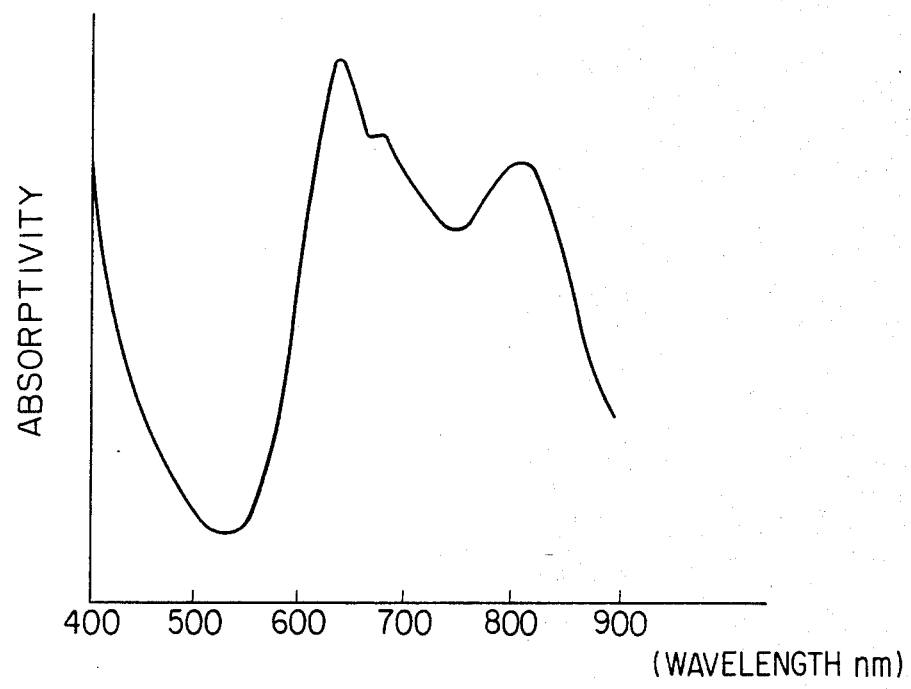

The first characteristic of the photosensitive member of this invention is that the charge generation layer thereof contains aluminum chloride phthalocyanine pigment. This charge generation layer can be prepared by applying a dispersion of said pigment in a binder resin solution or by other methods, either directly on a conductive layer or an intermediate layer (subbing layer) overlying the conductive layer. Moreover, the charge generation layer can also be formed on the upper side of the charge transport layer which will be described later in detail. In this case, the charge generation layer may be coated with a protective layer made of a macromolecular compound such as polyethylene, poly(vinyl chloride), polycarbonate, polyester, or poly(vinyl butyral).

Aluminum chloride phthalocyanine, used in the invention, is represented by the following formula:

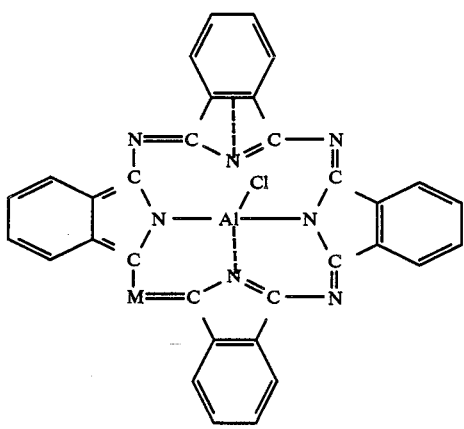

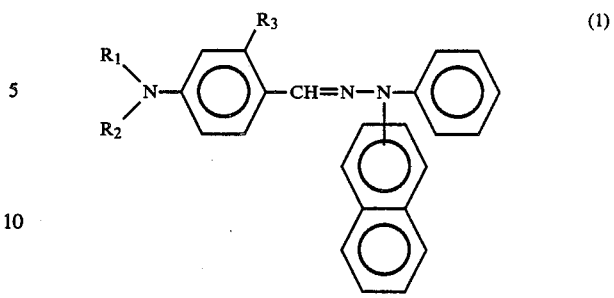

This is generally prepared by the condensation of phthalic anhydride or phthaldinitrile with aluminum chloride and urea in the presence or absence of a catalyst.

Examples of the binder used are poly(vinyl butyral), poly(vinyl acetal), polyester, polycarbonate, polyamide, polyurethane, and phenolic resin. The concentration of the binder resin in the charge generation layer is up to 80%, preferably up to 50%, particularly up to 40%, by weight (the concentration of aluminum chloride phthalocyanine in the charge generation layer is preferably at least 50%, particularly at least 60%, by weight).

Known methods using a ball mill, attritor, or the like can be applied to disperse the pigment, where the particle sizes of the pigment are reduced to desirably 5μ and less, preferably 0.5μ and less. The thus prepared dispersion of the pigment is applied by a coating method such as blade coating, Meyer bar coating, spray coating, dip coating, curtain coating, or bead coating method. Thickness of the charge generation layer is up to 5μ, preferably 0.5–1μ.

As shown in FIG. 1, aluminum chloride phthalocyanine exhibits a strong absorption in the wavelength region of from 750 to 850 nm. Therefore, electric charge can be generated by exposing the pigment to a laser beam of wavelength 750 nm or more. The generated charge then is injected into the charge transport layer by the action of an electric field.

For choosing the charge-transporting material to be contained in the charge transport layer, it has been proposed to evaluate the ionization potentials of possible materials as the measure of the selection. In practice, however, the selection at present is made by way of repeating a number of experiments. In this invention, the following hydrazone compound is used as charge-transporting material in the charge transport layer and aluminum chloride phthalocyanine is used as charge-generating material in the charge generation layer. Marked improvements of the photosensitive member in electrophotographic characteristics have been accomplished by this combined use of both the materials.

Thus, the second characteristic of the photosensitive member of this invention is that a hydrazone compound represented by the following general formula (1) is contained in the charge transport layer.

In the formula, $R_1$ and $R_2$ represent alkyls selected from the group consisting of ethyl, propyl, and butyl or represent residues forming, together with the nitrogen atom which links them, a cyclic amino group such as pyrrolidinyl, and $R_3$ represents hydrogen or a halogen selected from the group consisting of F, Cl, Br and I.

The photosensitive member of the invention has been extremely improved in sensitivity and photomemory property by using said aluminum chloride phthalocyanine and the hydrazone represented by the general formula (1).

The charge transport layer in this invention is preferably prepared by applying a solution of the hydrazone and a binder in a suitable solvent and drying the coating. Binders usable herein include polysulfone, acrylic resin, methacrylic resin, vinyl chloride resin, vinyl acetate resin, phenolic resin, epoxy resin, polyester resin, alkyd resin, polycarbonate, polyurethane, and copolymers consisting of two or more kinds of repeating units of these polymers. Of these binder resins, particularly preferred are polyester resin and polycarbonate. Further, photoconductive polymers having charge-transporting ability in themselves like poly(N-vinylcarbazole) can be used alternatively as the binder.

The compounding ratio of the binder to the charge-transporting material is desired to be in the range of 100:10 to 100:500 by weight. Thickness of the charge transport layer is in the range of from 2 to 100μ, preferably from 5 to 30μ. For the coating to form the charge transport layer, usual methods can be used such as blade coating, Meyer bar coating, spray coating, dip coating, bead coating, air-knife coating, and curtain coating.

Various common organic solvents can be used for the coating to form the charge transport layer in this invention. Typical examples thereof are; aromatic hydrocarbons or halogenated derivatives thereof such as benzene, toluene, xylene, mesitylene, and chlorobenzene; ketones such as acetone and 2-butanone; halogenated aliphatic hydrocarbons such as methylene chloride, chloroform, and ethylene chloride; cyclic or linear ethers such tetrahydrofuran and ethyl ether; and mixtures of these solvents.

Some additives can be incorporated into the charge transport layer in this invention. Such additives include, for example, diphenyl, O-terphenyl, P-terphenyl, dibutyl phthalate, dimethyl glycol phthalate, dioctyl phthalate, triphenyl phosphate, methyl-naphthalene, benzophenone, chlorinated paraffin, dilauryl thiodipropionate, 3,5-dinitrosalicyclic acid, various kinds of fluorocarbons, silicone oil, silicone rubber, and phenolic compounds such as dibutylhydroxytoluene, 2,2′-methylenebis(6-tert-butyl-4-methylphenol), α-tocopherol, 2-tert-octyl-5-chlorohydroquinone, and 2,5-di-tert-octylhydroquinone.

Typical examples of the hydrazone compound used in this invention are listed below.
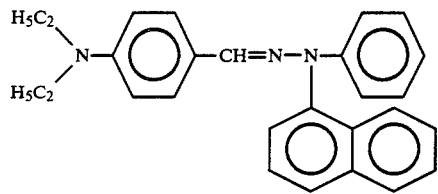
(1)
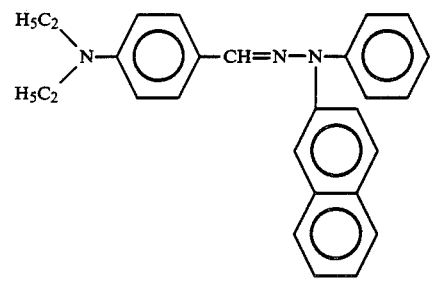
(2)
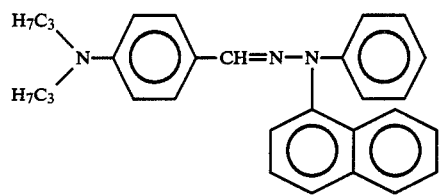
(3)
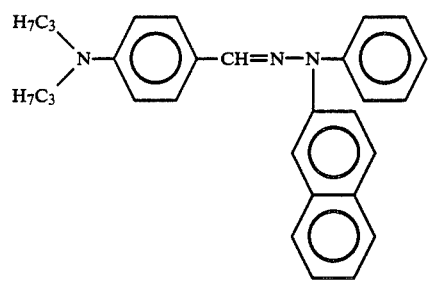
(4)
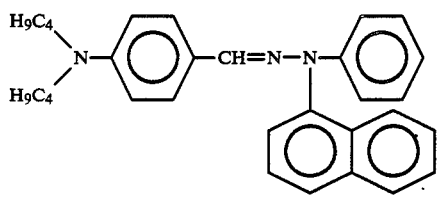
(5)
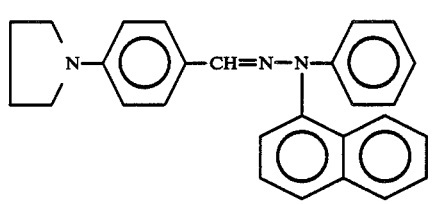
(6)
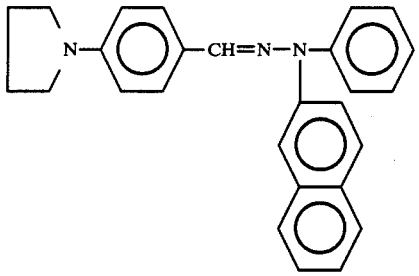
(7)
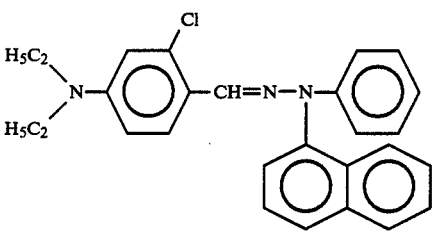
(8)
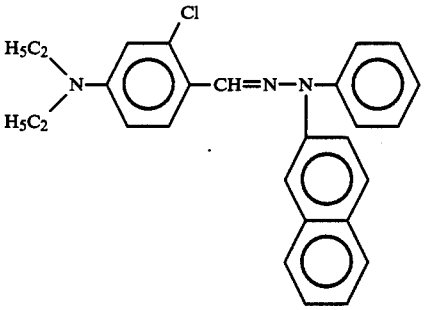
(9)
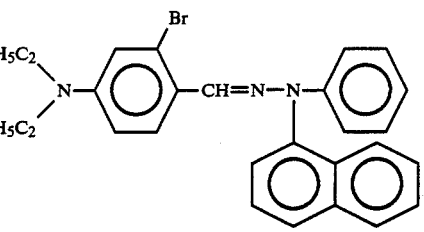
(10)
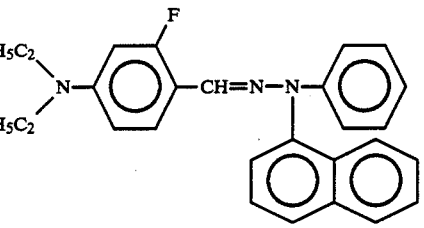
(11)
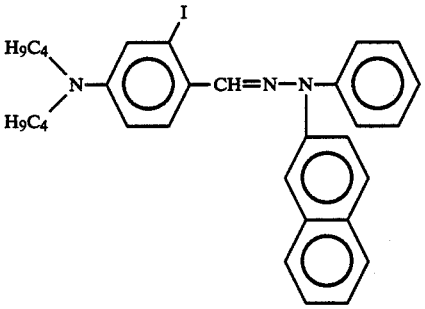
(12)

These compounds can be used singly or in combination of two or more.

The electrophotographic photosensitive member of this invention can be prepared by forming the charge generation layer containing the dispersed aluminum chloride phthalocyanine pigment, on a suitable substrate, and overlaying the charge generation layer with the charge transport layer containing the hydrazone compound. A subbing layer can be laid between the substrate and the charge generation layer. When the photosensitive layer of laminate structure is charged, this subbing layer inhibits the injection of free charge from the conductive substrate into the photosensitive layer and also acts as a bond layer to hold the photosensitive layer and the conductive substrate in a single body. This intermediate layer can be formed from, for example, polyethylene, polypropylene, acrylic resin, methacrylic resin, polyamide resin, vinyl chloride resin, vinyl acetate resin, phenolic resin, epoxy resin, polyester resin, alkyd resin, polycarbonate, polyurethane, polyimide resin, vinylidene chloride resin, vinyl chloride-vinyl acetate copolymer, poly(vinyl alcohol), water-soluble copolymer of acrylic acid and ethylene, nitrocellulose, casein, or gelatin. Thickness of the intermediate layer is in the range of from 0.1 to 5μ, preferably from 0.5 to 3μ.

The surface of the charge generation layer in this invention can be polished to mirror finish if necessary for securing a uniform injection of carriers from the charge generation layer to the overlying charge transport layer.

Any substrate having electric conductivity can be used for the electrophotographic photosensitive member of this invention. It may be of any type hitherto used. For example, the substrate can be made of; metals such as aluminum, copper, stainless steel, and brass; plastic sheets or the like on which aluminum, gold, or cuprous iodide is vapor-deposited or laminated; sheets of the like coated with a dispersion of conductive particles (e.g. carbon black, silver particles, aluminum particles, tin oxide particles, or zinc oxide particles) in a binder resin; and plastic sheets or the like in which the above conductive particles are dispersed. The substrate may be in any of sheet-like form, cylindrical form and other possible forms.

The electrophotographic photosensitive member of this invention can be applied to systems which utilize lasers or other devices emitting coherent rays as light sources. For example, the photosensitive member can be applied to electrophotographic printing plate making systems, besides electrophotographic printers.

According to this invention, there is provided an electrophotographic photosensitive member which is remarkably sensitive to rays of wavelengths 750 nm and more as compared with the laser-employing electrophotographic photosensitive member of the prior art, and is improved in photomemory property.

The electrophotographic photosensitive member of the invention, while particularly suitable for electrophotographic printers employing a semiconductor laser as light source, can be also used for usual electrophotographic systems employing an incoherent light source.

The invention is illustrated further with reference to the following examples. In the examples, all "parts" are by weight.

EXAMPLES 1-8

A solution of casein in aqueous ammonia (casein 11.2 g, 28% aqueous ammonia 1 g, water 222 ml) was applied by dip coating to a mirror-finished aluminum cylinder and dried to form a subbing layer of 1.0 g/m² in coating weight.

Then, 1 part of aluminum chloride phthalocyanine, 1 part of a butyral resin (tradename: Eslex BM-2, made by Sekisui Chem. Ind. Co., Ltd.), and 30 parts of isopropanol were charged in a ball-mill. The mixture was dispersed for 4 hours. The resulting dispersion was applied by dip coating to the subbing layer and dried to form a charge generation layer 0.3μ thick.

Then, 1 part of the above listed hydrazone compound No. 1 and 1 part of a polysulfone resin (tradename: Polysulfone P-1700, made by Union Carbide Corp.) were dissolved in 6 parts of monochlorobenzene with stirring. The solution was applied by dip coating to the charge generation layer and dried to form a charge transport layer 12μ thick.

The thus prepared photosensitive member was subjected to a corona discharge at −5 KV. The surface potential was measured at this moment (initial potential) and after 5-second standing in the dark (dark decay potential $V_5$). The sensitivity was evaluated by measuring the exposure quantity (E1/2 microjoule/cm²) necessary for halving the dark decay potential $V_5$. In this case, a gallium-aluminum-arsenic semiconductor laser (wavelength 790 nm) was employed as light source. The photomemory ($P_M$) was determined by illuminating the photosensitive member at an intensity of 600 lux for 3 minutes, leaving it for 1 minute in the dark, charging it again in the same manner as the above, and measuring the $V_0$. The difference between the $V_0$s before and after this high intensity illumination was defined as photomemory ($P_M$). That is, $P_M$ is represented by the following equation:

$P_M$=(surface potential $V_0$ before high intensity illumination)−(surface potential $V_0$ after high intensity illumination)

The above preparation and measurements were repeated using other hydrazone compounds listed above as charge-transporting materials. Results of the measurements are summarized in Table 1.

TABLE 1

| Example No. | Hydrazone compound No. | $V_0$ (−V) | $V_5$ (−V) | E½ (μ J/cm²) | $P_M$ (−V) |
|---|---|---|---|---|---|
| 1 | 1 | 600 | 580 | 0.2 | 20 |
| 2 | 2 | 610 | 590 | 0.3 | 25 |
| 3 | 3 | 630 | 590 | 0.3 | 30 |
| 4 | 5 | 590 | 570 | 0.2 | 20 |
| 5 | 6 | 565 | 550 | 0.3 | 35 |
| 6 | 8 | 590 | 560 | 0.4 | 30 |
| 7 | 9 | 560 | 550 | 0.3 | 40 |
| 8 | 12 | 580 | 540 | 0.2 | 30 |

COMPARATIVE EXAMPLES 1-6

Photosensitive members were prepared and measured charge bearing characteristics in the same manner as in Example 1 but using the charge-transporting materials shown in Table 2 in the place of the hydrazone compound No. 1. Results of the measurements are summarized in Table 3.

TABLE 2

| Comparative Example No. | Comparative charge-transporting material No. | Structural formula of comparative charge-transporting material |
|---|---|---|
| 1 | 1 | Carbazole with N-$C_2H_5$ substituent, linked via -CH=N-N(phenyl)(phenyl) |
| 2 | 2 | $(H_5C_2)_2N$-C$_6H_4$-CH=N-N(CH$_3$)(phenyl) |
| 3 | 3 | $(H_5C_2)_2N$-C$_6H_4$-CH=N-N(phenyl)(phenyl) |
| 4 | 4 | (pyrrolidinyl)N-C$_6H_4$-CH=N-N(phenyl)(phenyl) |
| 5 | 5 | $(H_5C_2)_2N$-C$_6H_4$-(pyrazoline with N-phenyl)-CH=CH-C$_6H_4$-N($C_2H_5)_2$ |
| 6 | 6 | $(H_5C_2)_2N$-C$_6H_4$-CH(furyl)-C$_6H_4$-N($C_2H_5)_2$ |

TABLE 3

| Comparative Example No. | Comparative charge-transporting material No. | $V_0$ (−V) | $V_5$ (−V) | $E_{\frac{1}{2}}$ (μ J/cm$^2$) | $P_M$ (−V) |
|---|---|---|---|---|---|
| 1 | 1 | 560 | 540 | 1.6 | 90 |
| 2 | 2 | 590 | 560 | 3.4 | 100 |
| 3 | 3 | 580 | 550 | 1.4 | 110 |
| 4 | 4 | 600 | 570 | 2.8 | 100 |
| 5 | 5 | 610 | 560 | 1.5 | 90 |
| 6 | 6 | 570 | 530 | 3.0 | 120 |

As is evident from the results shown in Table Nos. 1 and 3, the electrophotographic photosensitive member of this invention in which a hydrazone compound represented by the general formula (1) is used as charge-transporting material is excellent in sensitivity and exhibits for less $P_M$.

A low $P_M$ value is inestimably advantageous in practical use; for instance, charge bearing characteristics are kept stable and good quality images are formed constantly, even if a user has taken out a photosensitive member of low $P_M$ value from an LBP or copying machine and exposed it to artificial or natural light.

EXAMPLES 9-13

A mixture of

| | |
|---|---|
| SnO$_2$ powder (average particle size 0.4 μ) | 120 parts |
| Thermosetting acrylic resin (tradename: Acrydik 44-590, made by Dainippon Ink and Chemicals, Inc., 60 parts solids) | 120 parts |
| Xylene | 40 parts |
| Butanol | 15 parts | was dispersed in a ball-mill for 20 hours. The resulting dispersion was applied by dip coating to aluminum cylinders having a surface roughness of 3μ, and cured at 150° C. for 60 minutes to form a smooth conductive layer 20μ thick on each cylinder.

Then, a 0.5μ thick subbing layer was formed on each conductive SnO$_2$ layer by applying a methanolic solution of a polyamide resin (tradename: Toresin F-30, made by Teikoku Kagaku Sangyo Co., Ltd.). The same charge generation layers and charge transport layers as used in Example 1 were formed but the hydrazone compound Nos. 1, 4, 7, 10 and 11 were used as charge-transporting materials. Charge bearing characteristics of the thus prepared photosensitive members are shown in Table 4.

TABLE 4

| Example No. | Hydrazone compound No. | $V_0$ (−V) | $V_5$ (−V) | $E_{\frac{1}{2}}$ (μ J/cm$^2$) | $P_M$ (−V) |
|---|---|---|---|---|---|
| 9 | 1 | 580 | 550 | 0.3 | 30 |
| 10 | 4 | 590 | 550 | 0.4 | 20 |
| 11 | 7 | 600 | 570 | 0.3 | 30 |
| 12 | 10 | 610 | 560 | 0.3 | 35 |
| 13 | 11 | 580 | 540 | 0.4 | 20 |

COMPARATIVE EXAMPLES 7-10

Photosensitive members were prepared in the same manner but using the comparative charge-transporting material Nos. 1, 2, 3 and 5. Charge bearing characteristics of the photosensitive members are shown in Table 5.

TABLE 5

| Example No. | Comparative charge-transporting material No. | $V_0$ (−V) | $V_5$ (−V) | $E_{\frac{1}{2}}$ (μ J/cm$^2$) | $P_M$ (−V) |
|---|---|---|---|---|---|
| 7 | 1 | 590 | 550 | 1.5 | 110 |
| 8 | 2 | 600 | 560 | 3.9 | 90 |
| 9 | 3 | 610 | 565 | 1.4 | 120 |
| 10 | 5 | 580 | 545 | 1.8 | 100 |

As can be seen from Tables 4 and 5, the electrophotographic photosensitive member of this invention has a markedly high sensitivity to rays of wavelengths 750 nm and more and a notably improved photomemory property.

What we claim is:

1. An electrophotographic photosensitive member having a photosensitive layer of a laminate structure comprising a charge generation layer and a charge transport layer on a conductive substrate, characterized in that the charge generation layer contains an aluminum chloride phthalocyanine pigment and the charge transport layer contains a hydrazone compound represented by the general formula

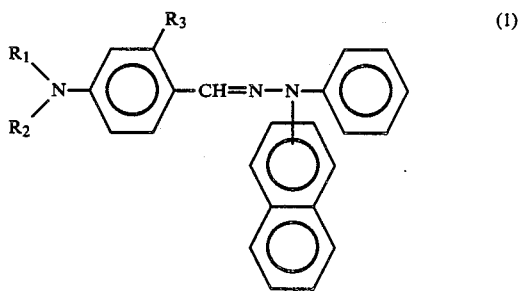

(1)

wherein, $R_1$ and $R_2$ represent alkyls or are residues forming a cyclic amino group together with the nitrogen atom which links them, and $R_3$ represents hydrogen or halogen.

2. The electrophotographic photosensitive member of claim 1, wherein the charge generation layer contains at least 50% by weight of the aluminum chloride phthalocyanine pigment.

3. The electrophotographic photosensitive member of claim 2, wherein the charge generation layer contains at least 60% by weight of the aluminum chloride phthalocyanine pigment.

4. The electrophotographic photosensitive member of claim 1, wherein the charge generation layer has a thickness of 5μ or less.

5. The electrophotographic photosensitive member of claim 1, wherein the charge generation layer has a thickness of 0.05-1μ.

6. THe electrophotographic photosensitive member of claim 1, wherein the charge transport layer is laminated on the upper side of the charge generation layer.

7. The electrophotographic photosensitive member of claim 6, which has an intermediate layer between the charge generation layer and the conductive substrate.

8. The electrophotographic photosensitive member of claim 7, wherein the intermediate layer comprises a conductive layer and a subbing layer.

* * * * *

UNITED STATES PATENT AND TRADEMARK OFFICE
CERTIFICATE OF CORRECTION

PATENT NO. : 4,535,043

DATED : August 13, 1985

INVENTOR(S) : Ishikawa, Shozo, Et Al.

It is certified that error appears in the above-identified patent and that said Letters Patent is hereby corrected as shown below:

Column 3, the formula should be:

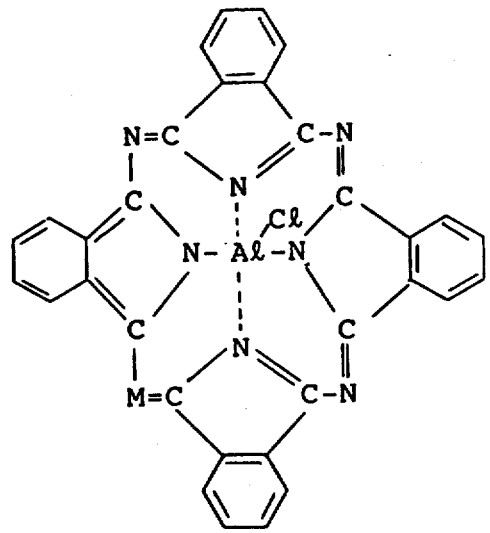

UNITED STATES PATENT AND TRADEMARK OFFICE
CERTIFICATE OF CORRECTION

PATENT NO. : 4,535,043            Page 2 of 2

DATED : August 13, 1985

INVENTOR(S) : Ishikawa, Shozo, Et Al.

It is certified that error appears in the above-identified patent and that said Letters Patent is hereby corrected as shown below:

Column 8, line 21, "dired" should be --dried--.
Column 10, line 62, "for" should be --far--.

Signed and Sealed this

Fourth Day of November, 1986

[SEAL]

*Attest:*

DONALD J. QUIGG

*Attesting Officer*                 *Commissioner of Patents and Trademarks*